(12) United States Patent
Spott et al.

(10) Patent No.: US 7,212,697 B2
(45) Date of Patent: May 1, 2007

(54) PLANAR OPTICAL CIRCUIT

(75) Inventors: Thorsten Spott, München (DE); Andreas Schumacher, München (DE)

(73) Assignee: Finisar Corporation, Sunnyvale, CA (US)

( * ) Notice: Subject to any disclaimer, the term of this patent is extended or adjusted under 35 U.S.C. 154(b) by 105 days.

(21) Appl. No.: 10/328,827

(22) Filed: Dec. 23, 2002

(65) Prior Publication Data
US 2003/0128908 A1    Jul. 10, 2003

(30) Foreign Application Priority Data
Dec. 21, 2001    (DE) ................. 101 64 589

(51) Int. Cl.
*G02B 6/12* (2006.01)
*G02B 6/00* (2006.01)
(52) U.S. Cl. .......................... 385/14; 385/129
(58) Field of Classification Search ................ 385/1–2, 385/4, 8, 14, 129–132
See application file for complete search history.

(56) References Cited

U.S. PATENT DOCUMENTS

| | | | | |
|---|---|---|---|---|
| 4,900,112 A | * | 2/1990 | Kawachi et al. ............... | 385/14 |
| 5,080,504 A | * | 1/1992 | Partain et al. ................ | 385/17 |
| 6,167,168 A | * | 12/2000 | Dieckroeger et al. .......... | 385/3 |
| 6,674,929 B2 | * | 1/2004 | Feng et al. .................... | 385/15 |
| 2002/0041739 A1 | * | 4/2002 | Wu ............................... | 385/88 |
| 2004/0017990 A1 | * | 1/2004 | Toofan et al. ............... | 385/129 |

FOREIGN PATENT DOCUMENTS

| | | |
|---|---|---|
| DE | 42 12 208 A1 | 10/1993 |
| DE | 44 46 101 A1 | 7/1996 |
| EP | 0 444 582 A2 | 9/1991 |
| EP | 0 837 352 A2 | 4/1998 |
| EP | 0 915 511 A2 | 5/1999 |
| JP | 61041132 A | 2/1986 |
| JP | 61151628 A  * | 7/1986 |

\* cited by examiner

*Primary Examiner*—Sung Pak
(74) *Attorney, Agent, or Firm*—Workman Nydegger

(57) ABSTRACT

The invention relates a planar optical circuit having at least one functional layer with structures for guidance, changing, regulation, control, production and/or detection of optical signals, a carrier substrate on which the at least one functional layer is formed, and at least two physically separate functional units which are formed in the at least one functional layer on the carrier substrate. According to the invention, the at least two functional units (2, 3) are thermally separated from one another by at least one trench structure (4) in the functional layer (11) and/or in the carrier substrate (11).

24 Claims, 5 Drawing Sheets

PLANAR OPTICAL CIRCUIT

BACKGROUND OF THE INVENTION

Field of the Invention

The invention relates to a planar optical circuit having at least one functional layer with structures for guidance, changing, regulation, control, production and/or detection of optical signals. A carrier substrate is provided on which the function layer is formed and at least two physically separate functional units are formed in the functional layer.

So-called planar optical circuits (PLC planar light circuits) are being used increasingly for the guided transmission of electromagnetic waves.

A planar optical circuit contains a number of layers including a lower layer used as a carrier substrate and is composed, for example, of silicon or glass. One or more functional layers is or are formed on the carrier substrate. Normal materials for the functional layer are silicon, glass or polymers.

In the functional layer or layers, the physical characteristics change spatially, and in some cases also with time, thus resulting in the production of guidance structures for electromagnetic radiation. One conventional example for the spatial change is a change in the refractive index n, which results in the formation of optical waveguides. If it is desired that the refractive index should change with time, then various physical effects are available to do this, for example thermooptical, electrooptical, acoustooptical and non-linear optical effects.

In some applications, additional layers are provided in order to produce the effects. For example, metal layers are used, which in the simplest case contains a metal layer which is disposed above corresponding optical waveguides, is heated when energy is supplied and thus leads to heating, and hence to a change in the optical characteristics, in the layer located underneath it, in particular in the optical waveguides.

In order to produce a PLC, a number of, for example, $SiO_2$ layers, which have different refractive indices, are deposited, for example, on a silicon wafer. These layers are a so-called buffer layer, a core layer and a top layer. The core layer, which is located between the buffer layer and the top layer, in this case has the highest refractive index. Before the core layer is covered by the top layer, the core layer is structured by a photolithographically produced mask and an etching method, such that only individual ribs of the layer now remain. The ribs are then coated with the top layer, and form the light-guiding waveguide core.

A large number of different functional units can be produced by a suitable configuration and variation of the spatial structures (for example waveguide structures) in the at least one functional layer of the planar optical circuit. Such functional units include, for example, optical waveguides, filters, switches, variable optical attenuators, sensors, diodes and amplifiers, although this list is not complete.

In order to increase the functionality of the planar optical circuit, it is worthwhile disposing a number of functional units on a common carrier substrate. This is advantageous since the number of functional units can first be produced jointly in this way and, second, the required optical connections between the individual functional units can be provided at the same time that they are produced. For example, filters are provided together with switches, amplifiers are provided together with filters, or filters are provided with sensors, etc., on a common carrier substrate.

The configuration of different functional units on a common carrier substrate results, however, in the problem of thermal coupling between the individual structural units. Thermal coupling represents a problem to the extent that it is frequently necessary to operate a first functional unit at a first temperature, while other functional units on the same carrier substrate need to be operated at second temperature that is not the same as the first temperature. This is associated, for example, with the fact that one of the functional units acts as a heat source or heat sink, for example by supplying energy to an optical switch or when using a laser diode, while one or more other functional units must be kept at a different temperature, which is as constant as possible.

There is therefore a requirement to define areas of different temperature in a planar optical circuit, in each of which different functional units are disposed. The areas should be thermally insulated from one another as well as possible in order to minimize thermal coupling between these areas.

It is known from Published, European Patent Application EP 915511 A2 for a cutout to be provided underneath the heated area in the carrier substrate for thermal isolation between an area of a functional layer which is heated by a heating device and is composed of glass, and a carrier substrate which is located underneath it and is composed of silicon. However, within a functional unit, this serves only to reduce the heat which is conducted from the functional layer into the carrier substrate, and thus to reduce the energy which is required for the heating device.

SUMMARY OF THE INVENTION

It is accordingly an object of the invention to provide a planar optical circuit that overcomes the above-mentioned disadvantages of the prior art devices of this general type, in which the different functional units are thermally decoupled from one another to a major extent.

With the foregoing and other objects in view there is provided, in accordance with the invention, a planar optical circuit. The planar optical circuit includes a carrier substrate, and at least one functional layer with structures for guidance, changing, regulation, control, production and/or detection of optical signals. The functional layer is disposed on the carrier substrate. A trench structure is formed in the functional layer and/or the carrier substrate. At least two physically separate functional units are formed in the functional layer, and the two functional units are thermally separated from one another by the trench structure.

The invention thus provides for the functional units to be thermally insulated from one another by a trench structure that is formed in the functional layer and/or in the carrier substrate of the planar optical circuit. A structured empty space is provided between the different functional units.

The trench structure, which contains one or more trenches, defines areas of different temperature on the carrier substrate, so that functional units can be operated with different thermal conditions on one carrier substrate. The trench structure interrupts or considerably reduces the heat exchange between individual functional units in different areas of the planar optical circuit, in a simple but at the same time a highly effective manner. This is based on the fact that the thermal conductivity of air is generally very much lower than the thermal conductivity of the carrier substrate or of the functional layers.

It should be mentioned that the term "trenches" for the purposes of the present invention covers any desired types of cutouts and openings. In particular, in addition to structures that represent an elongated depression in a carrier substrate or in a functional layer, it also covers cutouts, openings and intermediate spaces that pass all the way through, for example holes or gaps in the carrier substrate and/or in a functional layer. Furthermore, in addition to elongated structures, the term "trenches" also covers flat structures, for example circular or polygonal cutouts or holes.

The capability to dispose a number of functional units of a planar optical circuit, which have different thermal requirements, on a common carrier substrate allow the functional units to be produced, and at the same time be optically connected to one another, in the same manner, in a joint production process. The integration density in a planar optical circuit can thus be increased, and the production costs can be reduced.

The expression a functional unit for the purposes of the present invention relates to a structure of a planar optical circuit, which is used for changing, regulating, control, producing and/or detection of optical signals. In particular, this relates to optical filters, optical switches, optical attenuator units, sensors, light-emitting diodes, laser diodes or optical amplifiers. Individual functional units can also be defined in such a way that, in their own right, they are used for changing, regulating, controlling, producing and/or detection of optical signals and are optically connected to one another only by optical waveguides in the planar optical circuit.

The trench structure between the optical units may be configured in widely different ways. For example, it is possible for the trench structure to run only in the functional layer. Alternatively, the trench structure runs only in the carrier substrate. In this case, it is worthwhile forming the trench structure at least in those layers of the planar optical circuit that have the highest thermal conductivity. If the carrier substrate is composed of silicon, whose thermal conductivity is high, the trench structure should thus be present at least in the silicon substrate.

In one preferred refinement of the present invention, the trench structure runs in the functional layer and in the carrier substrate. The trench structure is in this case preferably formed by a cutout which extends through the functional layer and through the carrier substrate, that is to say the trench structure is a cutout/opening which passes through from one surface to the other and completely separates adjacent areas. This results in the highest possible level of thermal decoupling.

The side surfaces of the trench structure preferably run at right angles to the surface of the carrier substrate, so that the trench or the area that is filled with air has a constant width. However, it is likewise within the scope of the invention for the side surfaces of the trench structure to be configured such that they run at an angle to the surface of the carrier substrate, in particular in a V-shape. The shape of the cross section of the trenches also depends on the method for producing the trench structure. A V-shaped structure is obtained, for example, by preferably etching a silicon carrier substrate.

One preferred production method is laser cutting of the functional layer and/or of the carrier substrate. This method is relatively simple to carry out and leads directly to the desired trench structure. However, alternative methods such as wet etching or dry etching, or grinding methods, are likewise feasible.

The functional units are preferably optically connected to one another by waveguides, which are passed around the trench structure, in the planar optical circuit, so that signals can be interchanged between them.

It is within the scope of the invention for the trench structure to have one or more trenches, which if required may also have branches, between the functional units. The trenches in the trench structure are preferably elongated and may have a straight or curved shape. The precise shape is governed by the external contours of the functional units that need to be thermally decoupled.

It is likewise within the scope of the invention for the trench structure to have flat cutouts that are, for example, circular or rectangular. The broader the cutout, the better is the thermal decoupling between the individual functional units. In the extreme, the areas with the functional units are connected to one another only by webs, which have waveguide structures for the optical connection between the functional units.

One development of the invention provides for the trenches in the trench structure to be filled with a thermally highly insulating material once they have been produced. Although air is difficult to beat as a thermal insulator it may, however, be worthwhile, for example in order to improve the mechanical robustness of the planar optical circuit, to at least partially fill the trench structure with a thermally highly insulating material.

A further development provides for the trench structure to have a thermal insulator underneath it. By way of example, a thermally insulating glass plate may be adhesively bonded under a silicon carrier substrate in the area of the trench structure. A problem with the trench structure is that the component becomes more physically unstable. Stability can be improved, however, if the glass plate or other material is bonded to the carrier substrate in the trench region. Since the glass plate has a thermal conductivity lower than that of the removed chip material for forming the trench, the thermal isolation is improved relative to the case without the trench structure. However, the insulating glass plate does not allow for a further reduction of thermal coupling as the thermal conductivity of glass is higher than that of air. One of the functional units of the planar optical circuit is, for example, a unit which experiences a heat supply during its operation. In one preferred refinement of the invention, an optical filter and an optical switch are provided as the functional units, and are thermally decoupled from one another by a trench structure.

Other features which are considered as characteristic for the invention are set forth in the appended claims.

Although the invention is illustrated and described herein as embodied in a planar optical circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 6:
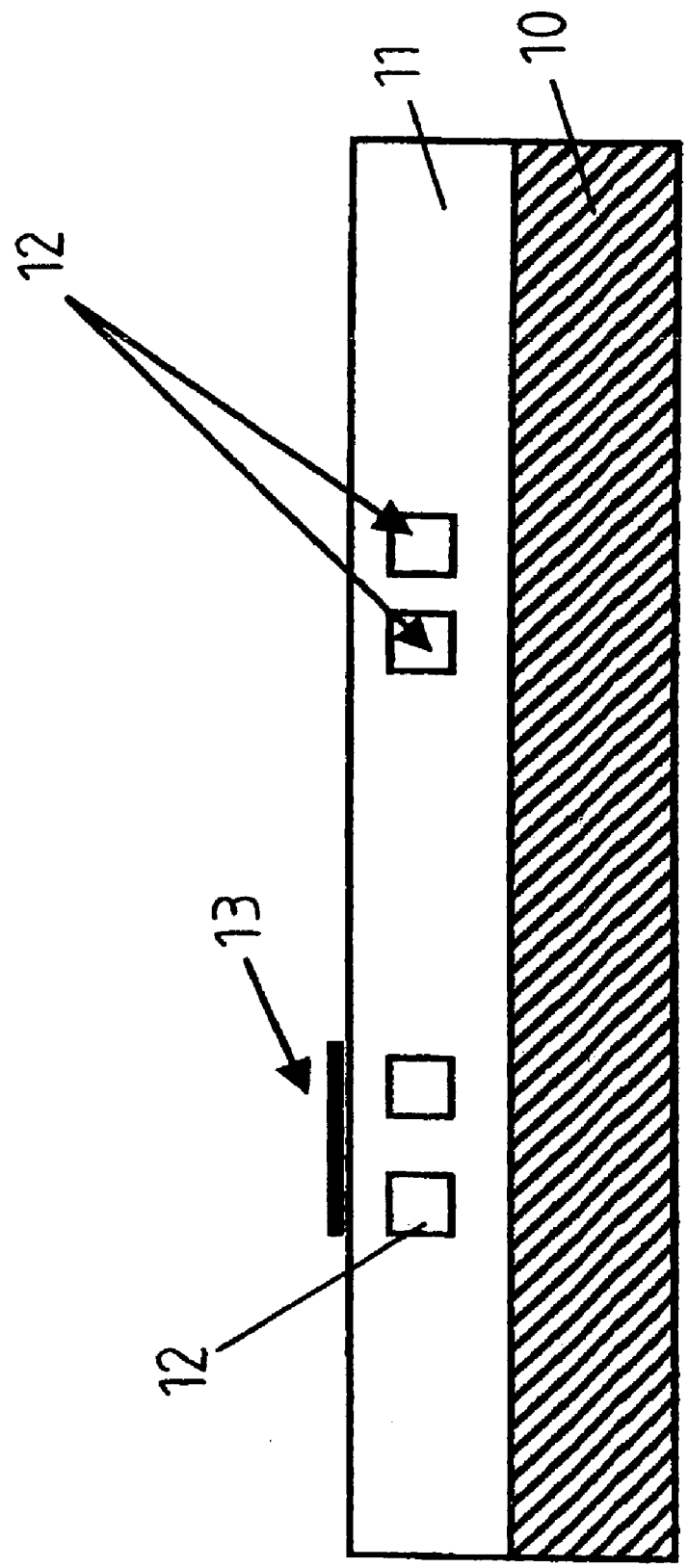
FIG. 6 is a sectional view of a basic structure of a planar optical circuit according to the prior art.

Referring now to the figures of the drawing in detail and first, particularly, to FIG. 6 thereof, there is shown a planar optical circuit containing a number of layers. As is illustrated schematically in FIG. 6, a lower layer 10 is used as a carrier substrate and is composed, for example, of silicon or glass. One or more functional layers 11 is or are formed on the carrier substrate 10. Normal materials for a functional layer 11 are silicon, glass or polymers.

In the functional layer or layers 11, the physical characteristics change spatially, and in some cases also with time, thus resulting in the production of guidance structures for electromagnetic radiation. One conventional example for the spatial change is a change in the refractive index n, in a formation of optical waveguides 12. If it is desired that the refractive index should change with time, then various physical effects are available to do this, for example thermooptical, electrooptical, acoustooptical and non-linear optical effects.

In some applications, additional layers are provided in order to produce the effects. For example, metal layers are used, which in the simplest case contains a metal layer 13 which is disposed above the corresponding optical waveguides 12, is heated when energy is supplied and thus leads to heating, and hence to a change in the optical characteristics, in the layer located underneath it, in particular in the optical waveguides 12.

Figure 1:
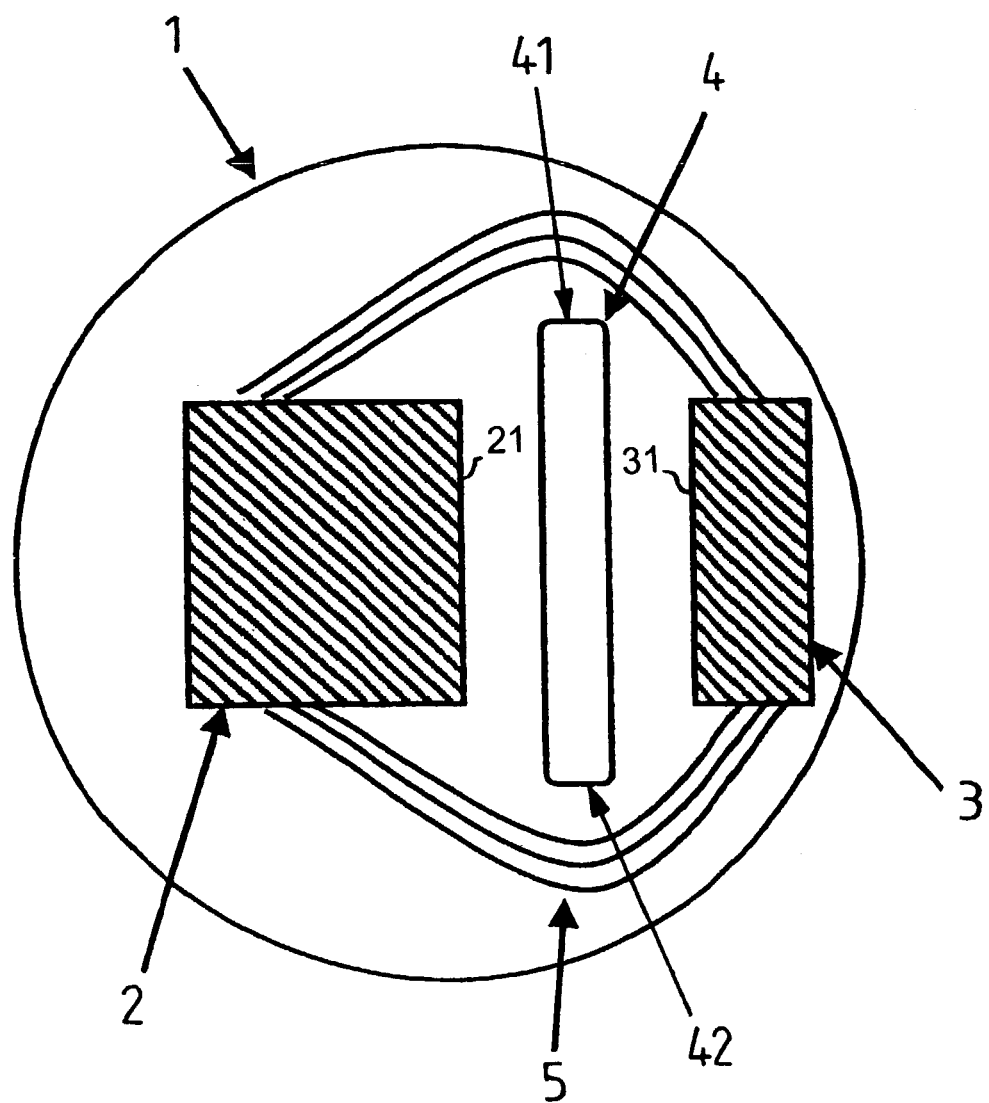
FIG. 1 is a diagrammatic, plan view of a planar optical circuit having two functional units according to the invention.

In accordance with the invention, FIG. 1 shows a planar optical circuit on which two functional units 2, 3 are disposed. One functional unit 2 is at a first temperature T1, and the other functional unit 3 is at a second temperature T2. The two functional units 2, 3 are formed on a common carrier substrate.

By way of example, the first functional unit 2 is an optical waveguide switch that has a Mach-Zehnder interferometer, in one of whose arms optical signals are phase-shifted as a result of a temperature change. Depending on the phase shift, the signals in the two arms are cancelled out or added. Switches such as these are known, for example, from International Patent Disclosure WO 01/42848. In order to adjust the temperature in the first arm, a metal strip is provided, to which power is supplied, depending on the desired phase angle, and the metal strip emits this power as thermal energy into the layer located underneath it. A waveguide switch is accordingly a functional unit to which thermal energy is supplied. Other examples of such functional units are light-emitting diodes or laser diodes.

The other functional unit 3 is, for example, an optical filter. In an optical filter, it is important for the filter to be kept at a constant temperature since, otherwise, the filter characteristics change.

The two functional units which are, for example, in the form of an optical waveguide switch 2 and an optical filter 3 form, for example, components of an add-drop multiplexer which is known per se and removes from an optical signal specific wavelengths which are multiplexed from a number of wavelengths in that optical signal, or supplies such wavelengths to this signal.

An elongated trench 4 is provided between the functional units 2, 3, in order to provide thermal decoupling or isolation between the two functional units 2, 3. The trench 4 in this case has a length that is greater than the length of the mutually facing side surfaces 21, 31 of the functional units 2, 3, thus providing good isolation between the functional units 2, 3.

Waveguides 5, which run in a curved shape around ends 41, 42 of the trench 4, are provided in order to transmit electromagnetic waves between the functional units 2, 3.

FIGS. 2 to 5 show examples of the configuration of the trench 4, in each case showing the area between one functional unit 2 and the other functional unit 3, in the form of a section illustration.

Figure 2:
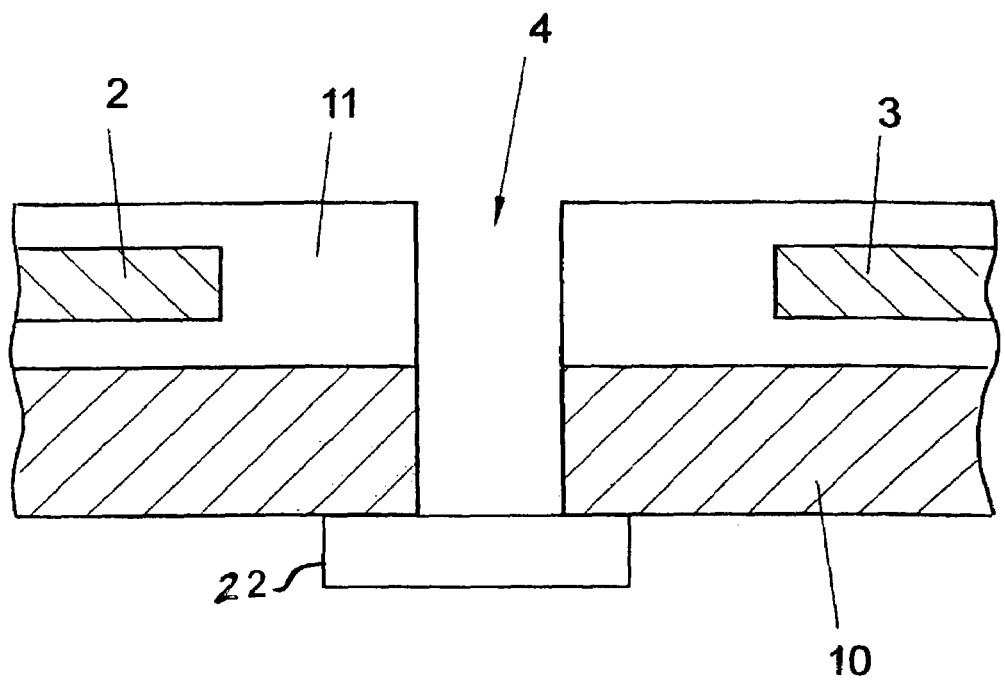
FIG. 2 is a cross-sectional view of a first exemplary embodiment of a trench structure.

According to the exemplary embodiment shown in FIG. 2, the functional units 2, 3 are formed in the functional layer 11 of the planar optical circuit 1. Both functional units 2, 3 are in this case disposed on a common carrier substrate 10. The trench 4 is in the form of a cutout or opening which extends both through the carrier substrate 10 and through the functional layer 11, and has a rectangular cross section. To a certain extent, it represents an elongated hole in the planar optical circuit 1. The carrier substrate 10 and the functional layer 11 are thus cut through completely by the trench 4, providing the best possible thermal decoupling between the two functional units 2, 3.

The trench 4 is produced, for example, by laser cutting.

Figure 3:
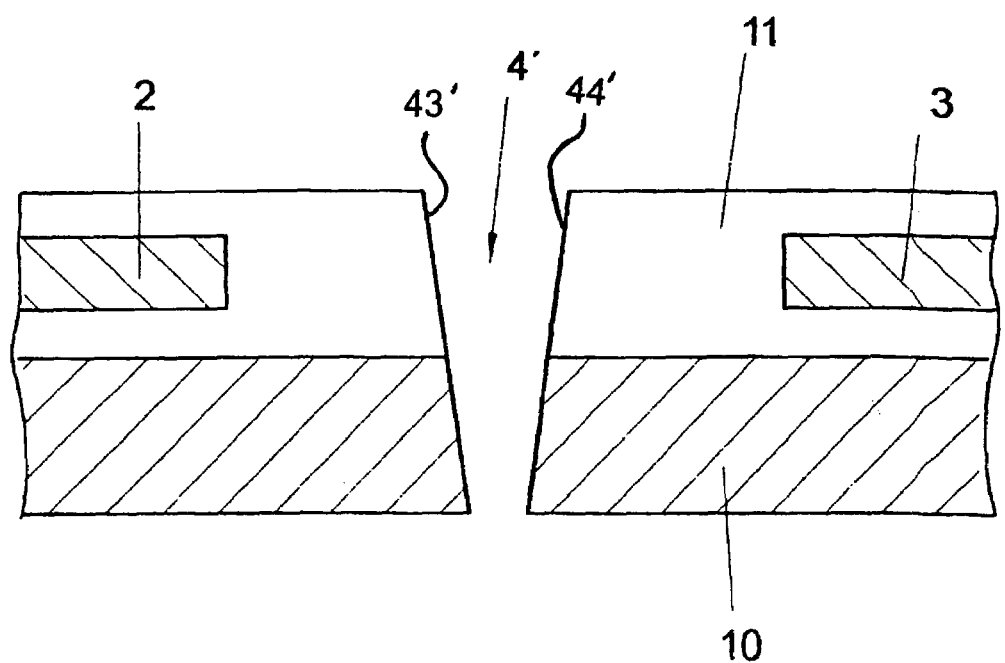
FIG. 3 is a cross-sectional view of a second exemplary embodiment of a trench structure.

In FIG. 3, a trench 4' likewise extends through the carrier substrate 10 and through the functional layer 11. However, side walls 43', 44' are formed at an angle to the surface of the planar optical circuit 1. The trench 4' with a shape such as this is produced, for example, by an etching process starting from the surface of the functional layer 11.

Figure 4:
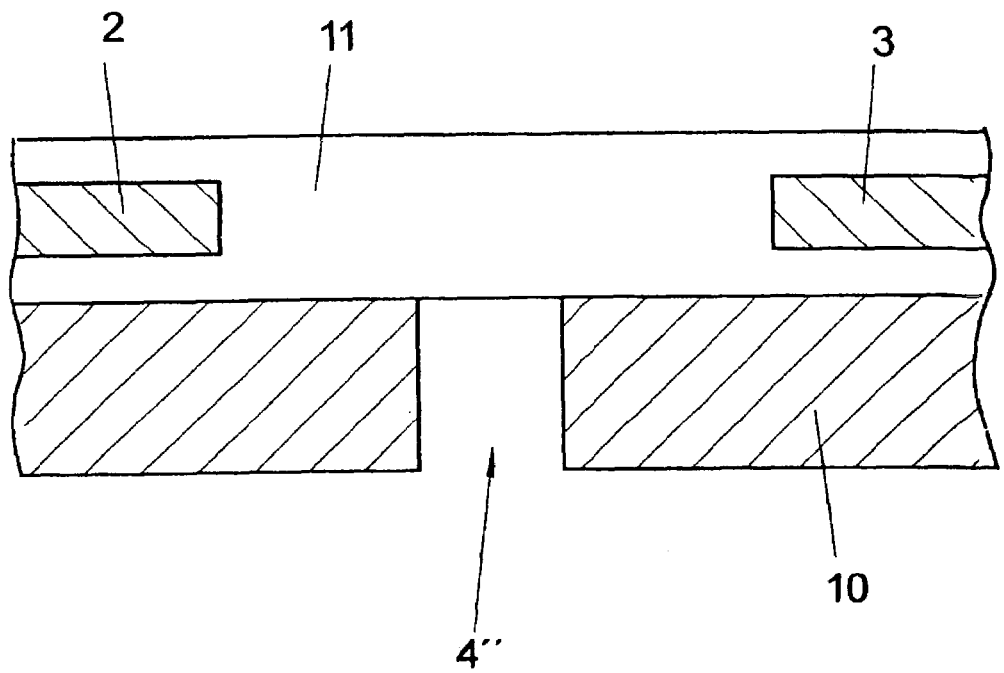
FIG. 4 is a cross-sectional view of a third exemplary embodiment of a trench structure.

In the exemplary embodiment in FIG. 4, a trench structure 4" is formed only in the carrier substrate 10. A variant such as this is worthwhile, for example, for glass on silicon technologies. Since the silicon substrate 10 has a considerably higher conductivity than the functional layer 11, which is composed of glass, the trench 4" in the silicon substrate 10, just on its own provides a high level of thermal decoupling, with the remaining functional layer 11 increasing the robustness of the configuration and allowing waveguides to be formed above the trench 4". The trench 4" in the illustrated example has a rectangular cross section and is produced, for example, by a grinding process.

Figure 5:
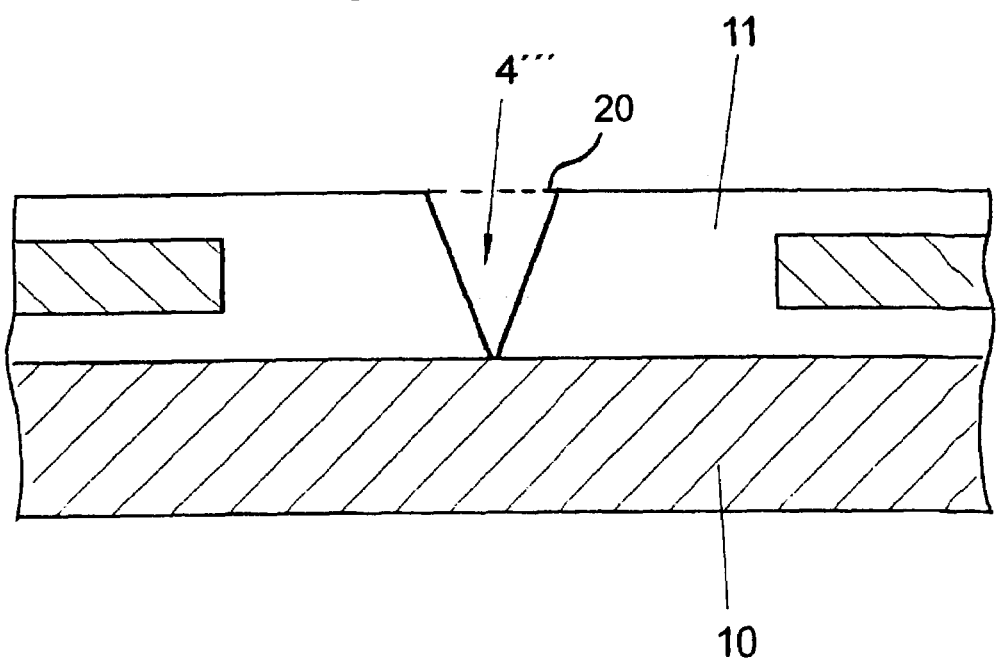
FIG. 5 is a cross-sectional view of a fourth exemplary embodiment of a trench structure.

The exemplary embodiment in FIG. 5 shows a variant in which a trench 4''' is formed only in the functional layer 11. This is worthwhile for applications in which the functional layer 11 has a higher thermal conductivity than the carrier substrate 10, that is to say when, for example, the carrier substrate is composed of glass and the functional layer 11 is composed of silicon.

A further development provides for the trench structure to have a thermal insulator underneath it. By way of example, a thermally insulating glass plate 22 may be adhesively bonded under the silicon carrier substrate 10 in the area of the trench structure (see FIG. 2). A problem with the trench structure is that the component becomes more physically unstable. Stability can be improved, however, if the glass plate 22 is bonded to the carrier substrate 10 in the trench region. Since the glass plate 22 has a thermal conductivity lower than that of the removed chip material for forming the trench, the thermal isolation is improved relative to the case without the trench structure. However, the insulating glass plate does not allow for a further reduction of thermal coupling as the thermal conductivity of glass is higher than that of air. In other words, the trench structure with the glass plate provides thermal separation in the sense of greatly reduced heat flow but not complete thermal separation.

Figure 7:
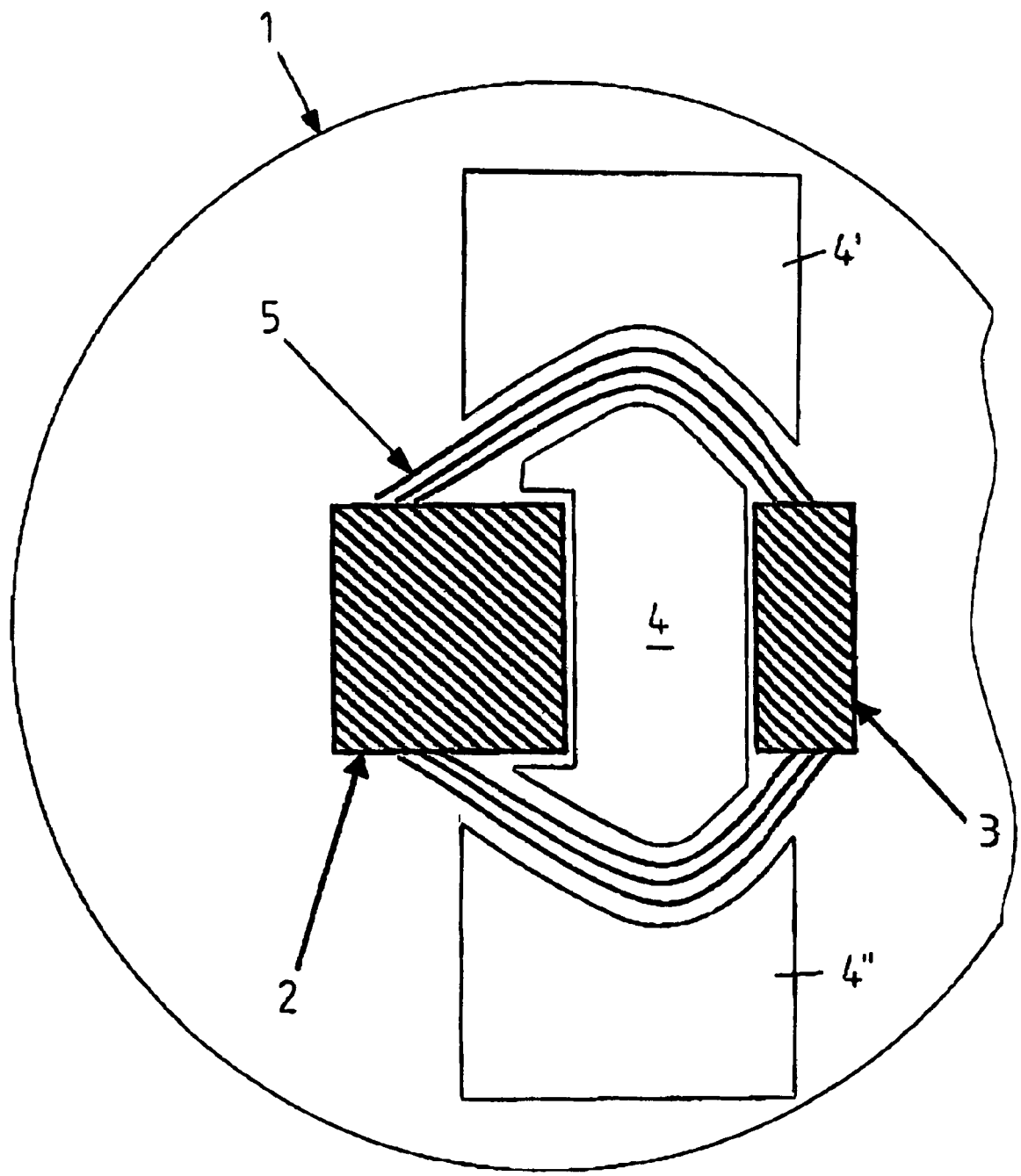
FIG. 7 shows a planar optical circuit in accordance with an embodiment of the present invention.

FIG. 7 shows a planar optical circuit, where two functional units 2, 3 are optically connected by means of waveguides 5. A trench structure 4 thermally separates the two functional units 2, 3 from each other. The trench 4 is embodied in a flat manner. Furthermore, the flat trenches 4', 4" are provided so that the waveguides 5 are embodied in webs and the functional units 2, 3 are connected with each other, only by the webs of waveguides 5.

The use of the invention is not restricted to the described exemplary embodiments. By way of example, the structures in the form of trenches may be designed to be square rather than being elongated. It is likewise possible for the structures that are in the form of trenches to be filled with a thermally insulating compound 20 once they have been produced. More than two functional units may also be provided, in each case being separated from one another by a trench, in which case the trenches may also have branches.

We claim:

1. A planar optical circuit, comprising:
   a carrier substrate;
   at least one functional layer disposed on said carrier substrate;
   a trench structure formed in at least one of said functional layer and said carrier substrate;
   at least two physically separate functional units formed in said functional layer, said at least two functional units thermally separated from one another by said trench structure, a first one of the at least two functional units having different thermal requirements than a second one of the at least two functional units; and
   waveguides passing around said trench structure and optically connecting said functional units to one another to transfer light from one of said at least two physically separate functional units to the other of said at least two physically separate functional units.

2. The planar optical circuit according to claim 1, wherein said trench structure runs only in said functional layer.

3. The planar optical circuit according to claim 1, wherein said trench structure runs only in said carrier substrate.

4. The planar optical circuit according to claim 1, wherein said trench structure runs in said functional layer and in said carrier substrate.

5. The planar optical circuit according to claim 4, wherein said trench structure is formed by a cutout extending completely through said functional layer and completely through said carrier substrate.

6. The planar optical circuit according to claim 1, wherein said carrier substrate has a surface and said trench structure has side surfaces running at right angles to said surface of said carrier substrate.

7. The planar optical circuit according to claim 1, wherein said carrier substrate has a surface and said trench structure has side surfaces formed such that said side surfaces run at a non-perpendicular angle to said surface of said carrier substrate.

8. The planar optical circuit according to claim 1, wherein said trench structure is produced by laser cutting of at least one of said functional layer and of said carrier substrate.

9. The planar optical circuit according to claim 1, wherein said trench structure is produced by one of wet etching and dry etching.

10. The planar optical circuit according to claim 1, wherein said trench structure includes at least one trench formed in at least one of said carrier substrate and said functional layer and is disposed between said two functional units.

11. The planar optical circuit according to claim 10, wherein said trench is one of a plurality of trenches each having an elongated shape.

12. The planar optical circuit according to claim 1, wherein said trench structure includes flat cutouts formed in at least one of said carrier substrate and said functional layer.

13. The planar optical circuit according to claim 1, wherein said trench structure is defined by a plurality of trenches formed in at least one of said carrier substrate and said functional layer and a thermally highly insulating material other than air filling said trenches.

14. The planar optical circuit according to claim 1, further comprising:
   a thermal insulator disposed underneath said trench structure.

15. The planar optical circuit according to claim 1, wherein at least one of said functional units is subject to a heat supply during its operation.

16. The planar optical circuit according to claim 1, wherein said two functional units are an optical filter and an optical switch.

17. The planar optical circuit according to claim 7, wherein said side surfaces of said trench structure are V-shaped.

18. The planar optical circuit according to claim 1, wherein said trench structure divides at least a portion of at least one of said carrier substrate and said functional layer into webs wherein the waveguides are positioned, said functional units are connected to one another only by said webs and are optically connected to each other by said waveguides.

19. The planar optical circuit according to claim 1, wherein the substrate has a relatively higher thermal conductivity than a thermal conductivity of the functional layer.

20. The planar optical circuit according to claim 1, wherein at least one of the functional units comprises an optical filter and another at least one of the functional units comprises one of: an optical switch; optical attenuator unit; sensor; light emitting diode; laser diode; and, optical amplifier.

21. The planar optical circuit according to claim 1, wherein the functional layer comprises one of: silicon; glass; polymer.

22. The planar optical circuit according to claim 1, wherein the substrate comprises one of: silicon; glass.

23. An add-drop multiplexer that includes the planar optical circuit according to claim 1.

24. The planar optical circuit according to claim 1, wherein:
   operation of the first one of the functional units is based upon a substantially constant temperature of the first one of the functional units; and
   operation of the second one of the functional units is based upon variations in temperature of the second one of the functional units.

* * * * *